United States Patent
Xu et al.

(10) Patent No.: US 12,056,524 B2
(45) Date of Patent: Aug. 6, 2024

(54) PREDICTIVE ANALYSIS ON RUNNING BATCH JOBS

(71) Applicant: International Business Machines Corporation, Armonk, NY (US)

(72) Inventors: Jing Xu, Xi'an (CN); Xue Ying Zhang, Xi'an (CN); Xiao Ming Ma, Xi'an (CN); Si Er Han, Xi'an (CN); Ji Hui Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 647 days.

(21) Appl. No.: 17/443,831

(22) Filed: Jul. 28, 2021

(65) Prior Publication Data

US 2023/0029853 A1   Feb. 2, 2023

(51) Int. Cl.
  *G06F 9/46*   (2006.01)
  *G06F 9/48*   (2006.01)
  *G06F 9/50*   (2006.01)
  *G06F 11/34*  (2006.01)

(52) U.S. Cl.
  CPC .......... *G06F 9/4887* (2013.01); *G06F 9/5005* (2013.01); *G06F 11/3423* (2013.01); *G06F 11/3452* (2013.01); *G06F 2209/501* (2013.01); *G06F 2209/5019* (2013.01)

(58) Field of Classification Search
  None
  See application file for complete search history.

(56) References Cited

U.S. PATENT DOCUMENTS

2018/0150783 A1* 5/2018 Xu .................. G06N 3/044

FOREIGN PATENT DOCUMENTS

| CN | 106897199 A | 6/2017 |
| CN | 111931009 A | 11/2020 |
| WO | WO2019193570 A1 | 10/2019 |
| WO | WO2020008392 A2 | 1/2020 |

OTHER PUBLICATIONS

Ahmad et al; Predicting Completion Times of Batch Query Workloads Using Interaction-aware Models and Simulation; EDBT 2011 (Year: 2011).*
Ravindran et al; A Predictive Algorithm for Adaptive Resource Management of Periodic Tasks in Asynchronous Real-Time Distributed Systems; IEEE Jan. 2001 (Year: 2001).*
Chahal et al., "PROWL: Towards Predicting the Runtime of Batch Workloads," ICPE'18 Companion, Apr. 9-13, 2018, Berlin, Germany, 2 pages.

* cited by examiner

*Primary Examiner* — Bing Zhao
(74) *Attorney, Agent, or Firm* — Yee & Associates, P.C.

(57) ABSTRACT

Performing predictive analysis on running batch jobs is provided. A series of batch end time predictive models is retrieved according to a sequence of milestone jobs in a batch of jobs. Retrieved batch end time predictive models are assembled into an aggregate batch end time predictive model to increase accuracy and stability of an end time prediction of the batch of jobs. The aggregate batch end time predictive model is utilized to predict an end time of the batch of jobs during running of the batch of jobs to form a predicted end time of the batch of jobs.

18 Claims, 6 Drawing Sheets

BATCH JOB PROFILING TABLE 300

| BATCH ID 302 | JOB PROFILING (FILTERED) 304 | | | BATCH PROFILING 306 | | TARGET BATCH END TIME 308 |
|---|---|---|---|---|---|---|
| | JOB RUNNING TIME 314 | JOB I/O CONSUMPTION 316 | JOB COMPUTING RESOURCE CONSUMPTION 318 | BATCH CALENDAR 320 | | |
| BATCH 1 (310) | | | | | o o o | |
| BATCH 2 (312) | o o o | o o o | | o o o | o o o | |
| o o o | o o o | o o o | o o o | o o o | o o o | o o o |

PREDICTIVE ANALYSIS ON RUNNING BATCH JOBS

BACKGROUND

1. Field

The disclosure relates generally to batch processing and more specifically to providing dynamic batch end time predictions during running of a batch of jobs using predictive analysis that is based on aggregating newly retrieved batch end time predictive models after each respective milestone job in the batch of jobs finishes running.

2. Description of the Related Art

Batch processing is the running of a group of jobs, which can run automatically on a computer without user interaction or can be scheduled as computer resources permit. A batch job is a scheduled program or set of programs that is assigned to run on the computer. Batch jobs are often queued during working hours and then executed during the evening or weekend when sufficient computer resources are available. Once a batch job is submitted, the batch job enters a queue where the batch job waits until the computer is ready to process the batch job. If the batch job queue contains a multitude of batch jobs waiting to be processed, then the computer may, for example, process batch jobs in chronological order, by priority, or a combination of both.

Batch jobs are frequently used to automate tasks, such as, for example, payroll, month-end reports, and the like, that need to be performed on a regular basis but do not necessarily need to be performed during daytime hours or have a user interact with the computer. In other words, batch jobs typically process high volumes of data that would typically consume a large amount of computer resources and time.

SUMMARY

According to one illustrative embodiment, a computer-implemented method for performing predictive analysis on running batch jobs is provided. A computer retrieves a series of batch end time predictive models according to a sequence of milestone jobs in a batch of jobs. The computer assembles retrieved batch end time predictive models into an aggregate batch end time predictive model to increase accuracy and stability of an end time prediction of the batch of jobs. The computer utilizes the aggregate batch end time predictive model to predict an end time of the batch of jobs during running of the batch of jobs to form a predicted end time of the batch of jobs. According to other illustrative embodiments, a computer system and computer program product for performing predictive analysis on running batch jobs are provided.

DETAILED DESCRIPTION

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
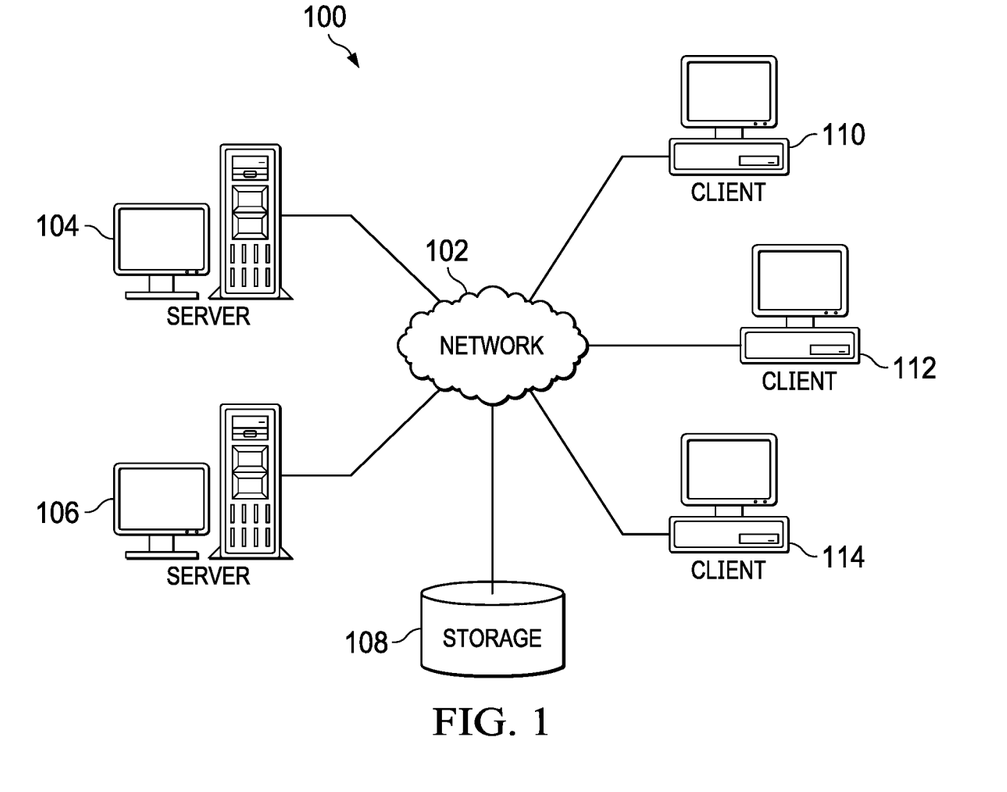
FIG. 1 is a pictorial representation of a network of data processing systems in which illustrative embodiments may be implemented.
Figure 2:
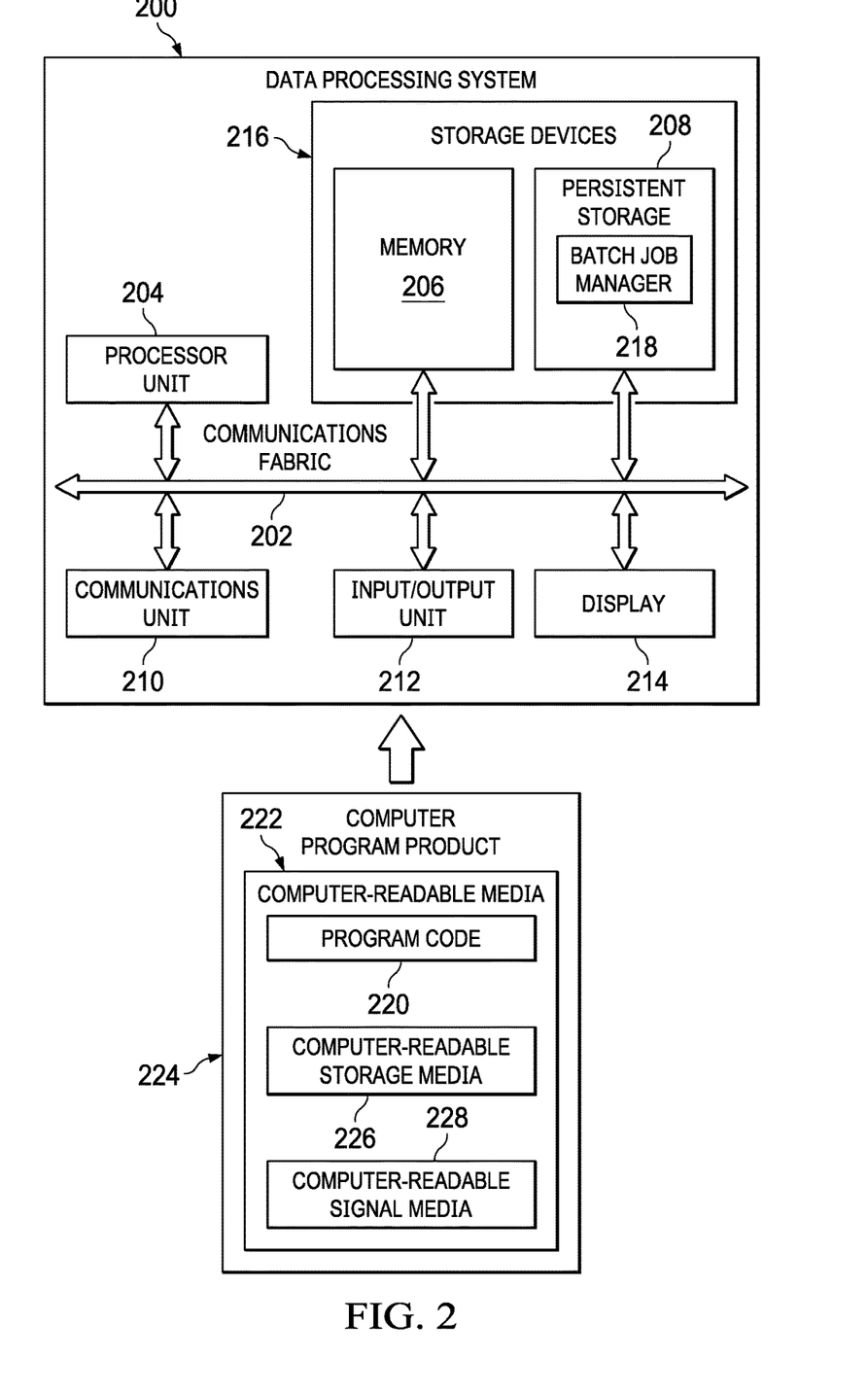
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. Also, server 104 and server 106 may each represent a cluster of servers in one or more data centers. Alternatively, server 104 and server 106 may each represent multiple computing nodes in one or more cloud environments.

In addition, server 104 and server 106 may provide services, such as, for example, banking services, financial services, governmental services, educational services, healthcare services, entertainment services, reservation services, insurance services, event monitoring services, or the like, to client device users. Further, server 104 and server 106 may perform batch processing of data corresponding to the services provided by server 104 and server 106 on a regular basis, such as, for example, daily, weekly, monthly, or the like. Server 104 and server 106 may perform the batch processing for billing, generating reports, balancing accounts, backing up data, generating account statements, and the like. Furthermore, server 104 and server 106 may perform predictive analysis on running batch jobs to predict batch end times to determine whether batch jobs are running normally or whether additional computing resources are needed to decrease batch job run times to meet batch job end time targets.

Client 110, client 112, and client 114 also connect to network 102. Clients 110, 112, and 114 are clients of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart watches, smart televisions, smart vehicles, smart appliances, gaming devices, kiosks, and the like, with wire or wireless communication links to network 102. Users of clients 110, 112, and 114 may utilize clients 110, 112, and 114 to access and utilize the services provided by server 104 and server 106.

Storage 108 is a network storage device capable of storing any type of data in a structured format or an unstructured format. In addition, storage 108 may represent a plurality of network storage devices. Further, storage 108 may store historic batch job information, such as, for example, historic batch job features, historic batch job runtimes, historic batch job input/output consumption, historic batch job computing resource consumption, historic patterns of batch jobs running within different time periods, and the like. Storage 108 may also store identifiers and network addresses for a plurality of servers, identifiers and network addresses for a plurality of client devices, identifiers for a plurality of client device users, and the like. Furthermore, storage 108 may store other types of data, such as authentication or credential data that may include usernames, passwords, and the like associated with, for example, client device users and system administrators.

In addition, it should be noted that network data processing system 100 may include any number of additional servers, clients, storage devices, and other devices not shown. Program code located in network data processing system 100 may be stored on a computer-readable storage medium or a set of computer-readable storage media and downloaded to a computer or other data processing device for use. For example, program code may be stored on a computer-readable storage medium on server 104 and downloaded to client 110 over network 102 for use on client 110.

In the depicted example, network data processing system 100 may be implemented as a number of different types of communication networks, such as, for example, an internet, an intranet, a wide area network (WAN), a local area network (LAN), a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to FIG. 2, a diagram of a data processing system is depicted in accordance with an illustrative embodiment. Data processing system 200 is an example of a computer, such as server 104 or server 106 in FIG. 1, in which computer-readable program code or instructions implementing the predictive batch end time analysis processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer-readable storage device or a computer-readable storage medium is any piece of hardware that is capable of storing information, such as, for example, without limitation, data, computer-readable program code in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores batch job manager 218. However, it should be noted that even though batch job manager 218 is illustrated as residing in persistent storage 208, in an alternative illustrative embodiment, batch job manager 218 may be a separate component of data processing system 200. For example, batch job manager 218 may be a hardware component coupled to communication fabric 202 or a combination of hardware and software components. In another alternative illustrative embodiment, a first set of components of batch job manager 218 may be located in data processing system 200 and a second set of components of batch job manager 218 may be located in a second data processing system, such as, for example, server 106 in FIG. 1.

Batch job manager 218 controls the process of dynamically predicting batch end time during running of a batch of jobs using predictive analysis that is based on aggregating newly generated batch end time predictive models after each respective milestone job in the batch of jobs finishes running. It should be noted that batch job manager 218 may include an artificial intelligence component. The artificial intelligence component has intelligent behavior and can be based on the function of a human brain. The artificial intelligence component comprises at least one of an artificial neural network, cognitive system, Bayesian network, fuzzy logic, expert system, natural language processing system, or some other suitable system. Machine learning can be used to train the artificial intelligence component. Machine learning involves inputting data to the process and allowing the process to adjust and improve the function of the artificial intelligence component, thereby increasing the predictive accuracy of the artificial intelligence component and, thus, increasing the performance of data processing system 200, itself.

A machine learning model of the artificial intelligence component can learn without being explicitly programmed to do so. The machine learning model can learn based on training data input into the machine learning model. The machine learning model can learn using various types of machine learning algorithms. The machine learning algorithms include at least one of a supervised learning, semi-supervised learning, unsupervised learning, feature learning, sparse dictionary learning, anomaly detection, association rules, or other types of learning algorithms. Examples of machine learning models include an artificial neural network, a decision tree, a support vector machine, a Bayesian network, a genetic algorithm, and other types of models. These machine learning models can be trained using historic information corresponding to batch jobs, such as, for example, historic batch job features, batch job runtimes, batch job input/output consumption, batch job computing resource consumption, patterns of batch jobs running within different time periods, and the like.

Batch job manager 218 may utilize the artificial intelligence component to generate batch end time predictive models that predict the batch end time of the batch of jobs during running of the batch of jobs. In addition, if batch job manager 218 determines that the predicted batch end time is outside a specified target batch end time, then batch job manager 218 may utilize the artificial intelligence component to perform a what-if analysis using adjustable batch job features, such as, for example, amount of central processing unit (CPU) or other computing resource consumed per hour by the batch job, to determine whether a reduction in batch job runtime is possible. If batch job manager 218 determines that a reduction in batch job runtime is possible based on the what-if analysis, then batch job manager 218 may automatically adjust one or more batch job features to reduce the batch runtime to within the specified target batch end time. Further, batch job manager 218 may send an alert to a user, such as, for example, a system administrator, indicating that the automatic adjustment was performed to meet the specified target batch end time.

As a result, data processing system 200 operates as a special purpose computer system in which batch job manager 218 in data processing system 200 enables predictive end time analysis on running batch jobs. In particular, batch job manager 218 transforms data processing system 200 into a special purpose computer system as compared to currently available general computer systems that do not have batch job manager 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer-readable program code that may be read and run by a processor in processor unit 204. The program instructions, in the different embodiments, may be embodied on different physical computer-readable storage devices, such as memory 206 or persistent storage 208.

Program code 220 is located in a functional form on computer-readable media 222 that is selectively removable and may be loaded onto or transferred to data processing system 200 for running by processor unit 204. Program code 220 and computer-readable media 222 form computer program product 224. In one example, computer-readable media 222 may be computer-readable storage media 226 or computer-readable signal media 228.

In these illustrative examples, computer-readable storage media 226 is a physical or tangible storage device used to store program code 220 rather than a medium that propagates or transmits program code 220. Computer-readable storage media 226 may include, for example, an optical or magnetic disc that is inserted or placed into a drive or other device that is part of persistent storage 208 for transfer onto a storage device, such as a hard drive, that is part of persistent storage 208. Computer-readable storage media 226 also may take the form of a persistent storage, such as a hard drive, a thumb drive, or a flash memory that is connected to data processing system 200.

Alternatively, program code 220 may be transferred to data processing system 200 using computer-readable signal media 228. Computer-readable signal media 228 may be, for example, a propagated data signal containing program code 220. For example, computer-readable signal media 228 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 222" can be singular or plural. For example, program code 220 can be located in computer-readable media 222 in the form of a single storage device or system. In another example, program code 220 can be located in computer-readable media 222 that is distributed in multiple data processing systems. In other words, some instructions in program code 220 can be located in one data processing system while other instructions in program code 220 can be located in one or more other data processing systems. For example, a portion of program code 220 can be located in computer-readable media 222 in a server computer while another portion of program code 220 can be located in computer-readable media 222 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 220.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Typically, batch jobs are tasks run on a regular time interval basis, such as, for example, daily, weekly, biweekly, monthly, or the like, in many industries. For example, in the banking industry, batch jobs are run on a daily basis where the batch of jobs often starts at midnight and ends later that day. Running time for the entire batch of jobs may vary from 2-3 hours to over 10 hours based on the volume of the data or task.

It is necessary to monitor the running of batch jobs and predict the batch end time. This monitoring helps users understand whether a batch is running normally or whether a need exists to add more computing resources to decrease the running time of the batch of jobs.

However, a number of challenges exist in running batch jobs. For example, the number of jobs in a batch may be large, such as over ten thousand jobs. In addition, the jobs do not run in a static manner. Depending on particular system conditions, some jobs in the batch may run, while other jobs in the batch may not run. Further, jobs in the batch may not run in a fixed order.

Illustrative embodiments predict the end time of a batch of jobs by profiling each respective job in the batch and profiling the batch as a whole based on features using statistical analysis on original or raw data (e.g., distribution of each profiling feature) corresponding to the batch of jobs. The features may include, for example, job running time (e.g., current and historic running time of a particular job), job input/output consumption (e.g., reads, writes, and the like of the particular job), job computing resource consumption (e.g., CPU, memory, storage, and the like consumed by the particular job), batch running time (e.g., current, historic, and predicted running time of the batch), batch calendar (e.g., day and time when the batch previously ran, such as weekend, after business hours, during business hours, which can indicate patterns of running jobs in a time period), and the like. Also, it should be noted that illustrative embodiments may exclude or ignore certain job features, such as, for example, jobs that run for less than a predefined amount of time, jobs that have less than a predefined coefficient of variation in runtime, input/output consumption, computing resource consumption, and the like, jobs that have a number of missing feature values greater than a threshold number of missing values, and the like.

In addition, illustrative embodiments further predict the end time of the batch of jobs by identifying a group of important jobs in the batch of jobs based on the profiling of the features of each respective job and the batch of jobs as a whole using correlation analysis. An important job in the identified group of important jobs has a level of correlation with the predicted end time of the batch of jobs that is greater than a predefined minimum threshold level of correlation, such as, for example, greater than 50% correlation. Further, illustrative embodiments identify a sequence of milestone jobs from the group of important jobs using sequence analysis. Each milestone job in the sequence has an identified fixed running order with a particular important job and the number of milestone jobs is limited based on the sequence analysis. Furthermore, illustrative embodiments generate a series of batch end time predictive models according to the sequence of milestone jobs. Illustrative embodiments generate a new batch end time predictive model in the series of batch end time predictive models after each respective milestone job in the sequence of milestone jobs finishes running. Moreover, illustrative embodiments assemble each generated batch end time predictive model into an aggregated batch end time predictive model to increase accuracy and stability of the batch end time prediction. Illustrative embodiments utilize the aggregated batch end time predictive model to predict the end time of the batch during running of the batch of jobs.

Thus, even though a particular batch may include a large number of jobs, illustrative embodiments are capable of predicting the execution end time of the entire batch of jobs as batch jobs are running and continue to dynamically update the predicted batch end time during running of the batch of jobs instead of predicting the batch end time just once. In addition, illustrative embodiments also enable what-if analysis when some adjustable features, such as, for example, amount of CPU consumed per hour, are included as predictors in batch end time predictive models. For example, illustrative embodiments can utilize the what-if analysis to determine whether increasing by a certain percentage the amount of CPU consumed per hour by a batch of jobs will decrease the running time of the entire batch to within a user-specified maximum threshold amount of time. Further, illustrative embodiments can update the batch end time prediction dynamically during the running of the batch of jobs, which provides increased monitoring precision of the running status of the batch of jobs. As a result, illustrative embodiments provide dynamic batch job end time predictions during the running of batch jobs in a production environment, as opposed to predicting batch job end times in a simulation environment.

Thus, illustrative embodiments provide one or more technical solutions that overcome a technical problem with accurately predicting batch end time during running of a batch of jobs. As a result, these one or more technical solutions provide a technical effect and practical application in the field of batch processing.

Figure 3:
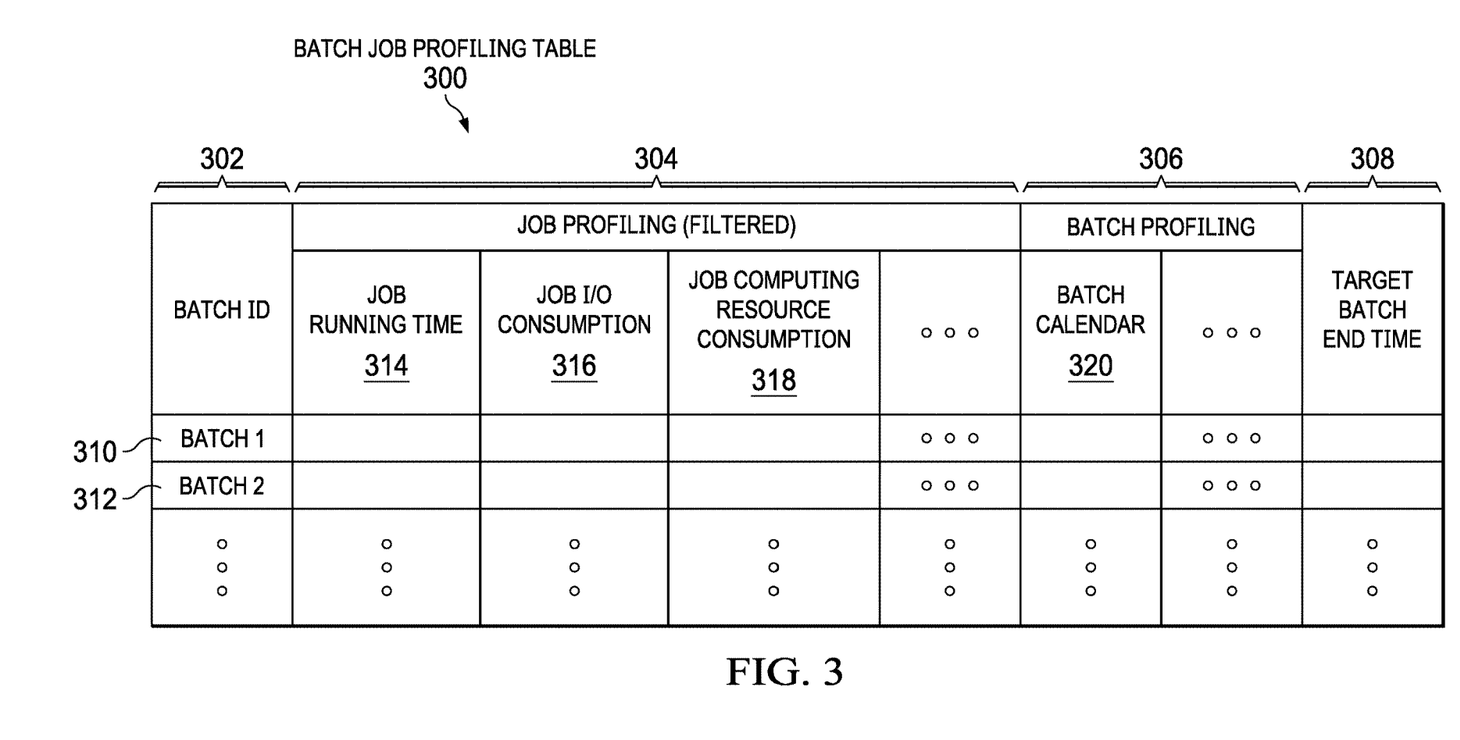
FIG. 3 is a diagram illustrating an example of a batch job profiling table in accordance with an illustrative embodiment.

With reference now to FIG. 3, a diagram illustrating an example of a batch job profiling table is depicted in accordance with an illustrative embodiment. Batch job profiling table 300 may be implemented in a computer, such as, for example, server 104 or server 106 in FIG. 1 or data processing system 200 in FIG. 2. For example, batch job profiling table 300 may be implemented by batch job manager 218 in FIG. 2.

In this example, batch job profiling table 300 includes batch identifier (ID) 302, job profiling 304, batch profiling 306, and target batch end time 308. Batch ID 302 uniquely identifies each respective running batch of jobs. Job profiling 304 includes a set of features corresponding to each respective job in a particular batch of jobs. Batch profiling 306 includes a set of features corresponding to each respective batch of jobs as a whole. Target batch end time 308 identifies a specified batch end time target corresponding to each respective batch of jobs.

In this example, batch ID 302 includes batch 1 310, batch 2 312, and so on. Each respective running batch of jobs corresponds to one record in batch job profiling table 300.

Job profiling 304 includes job running time 314, job input/output (I/O) consumption 316, job computing resource consumption 318, and the like. Job running time 314 represents a running time of a particular job in a batch. Job I/O consumption 316 represents, for example, reads, writes, and the like, corresponding to a particular job in a batch. Job computing resource consumption 318 represents consumption of computing resources, such as, for example, CPU, memory, storage, and the like, by a particular job in a batch.

Also, it should be noted that the job profiling 304 is filtered. In other words, the batch job manager of illustrative embodiments may exclude certain jobs from job profiling 304, such as, for example, jobs that run for less than a predefined amount of time, jobs that have less than a predefined coefficient of variation in features, such as runtime, I/O consumption, computing resource consumption, and the like, jobs that have too many missing feature values, and the like.

Batch profiling 306 includes batch calendar 320 and the like. Batch calendar 320 represents, for example, day and time when a particular batch of jobs previously ran. Batch calendar 320 may provide, for example, a pattern of running a particular batch of jobs within a defined time period and the like. Batch profiling 306 may also include, for example, historic running times of each respective batch of jobs.

In addition, the batch job manager of illustrative embodiments may utilize the data contained in job profiling 304 and batch profiling 306 as training data. The batch job manager may input the training data into a set of machine learning models corresponding to an artificial intelligence component of the batch job manager to predict batch end times. Batch end times are the targets to predict, while profiling features are predictors. If one or more profiling feature values do not appear in a record corresponding to a particular batch, then the batch job manager considers those values as missing.

Figure 4:
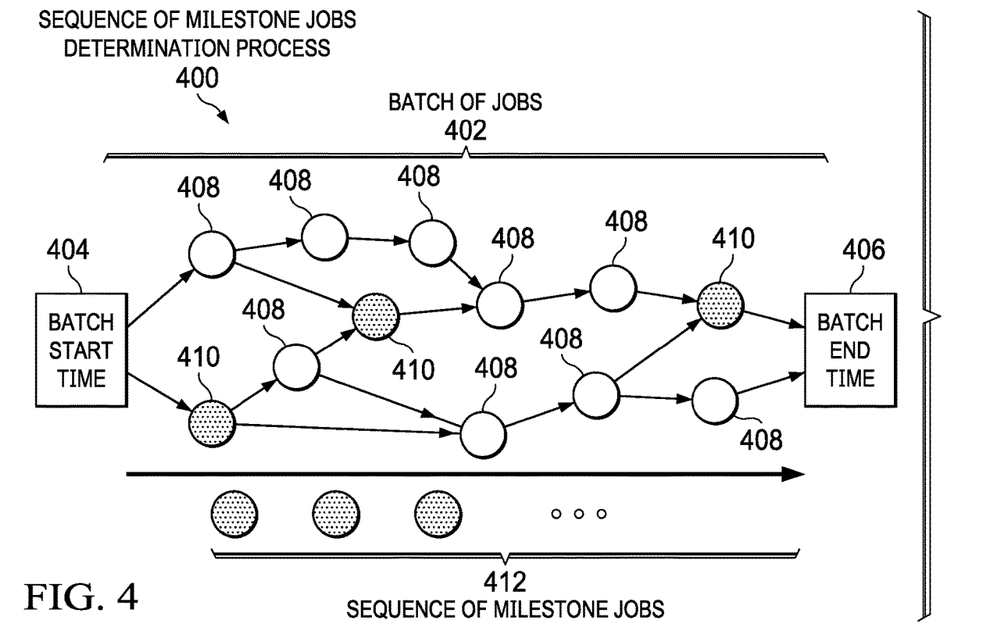
FIG. 4 is a diagram illustrating an example of a sequence of milestone jobs determination process in accordance with an illustrative embodiment.

With reference now to FIG. 4, a diagram illustrating an example of a sequence of milestone jobs determination process is depicted in accordance with an illustrative embodiment. Sequence of milestone jobs determination process 400 may be implemented in a computer, such as, for example, server 104 or server 106 in FIG. 1 or data processing system 200 in FIG. 2. For example, sequence of milestone jobs determination process 400 may be implemented by batch job manager 218 in FIG. 2.

In this example, sequence of milestone jobs determination process 400 includes batch of jobs 402. Batch of jobs 402 may be, for example, batch 1 310 in FIG. 3. Batch of jobs 402 has batch start time 404 and batch end time 406. Batch of jobs 402 includes important jobs 408 and milestone jobs 410.

An important job is present in almost every batch of jobs. In other words, an important job is included in a minimum threshold percentage of batches, such as, for example, in 80% or more of batches. Also, profiling features of an important job have a high correlation with predicted batch end times. The profiling features having a high correlation with predicted batch end times may be, for example, job running time, job I/O consumption, and job computing resource consumption, such as, for example, job running time 314, job I/O consumption 316, and job computing resource consumption 318 in FIG. 3. It should be noted that all jobs in a particular batch may be important jobs or only a portion of jobs in a particular batch may be important jobs.

The batch job manager of illustrative embodiments identifies a group of important jobs 408 in batch of jobs 402. In addition, the batch job manager identifies an order of running of the group of important jobs 408. The batch job manager can determine the order of running of important jobs by analyzing the start and end time of each respective important job in the group. Further, the batch job manager identifies milestone jobs 410 in important jobs 408. A milestone job has a fixed running order with a particular important job. As an example, the batch job manager may determine that job 5 always follows job 1 in a batch. Job 5 may have a dependency on job 1 finishing first before running. As a result, job 5 has a fixed pattern of running with job 1. As such, job 5 in this example is a milestone job. The batch job manager applies a sequence pattern mining algorithm or model to determine sequence of milestone jobs 412. Sequential pattern mining is data mining concerned with finding statistically relevant patterns between examples where the examples are delivered in a sequence.

Figure 5:
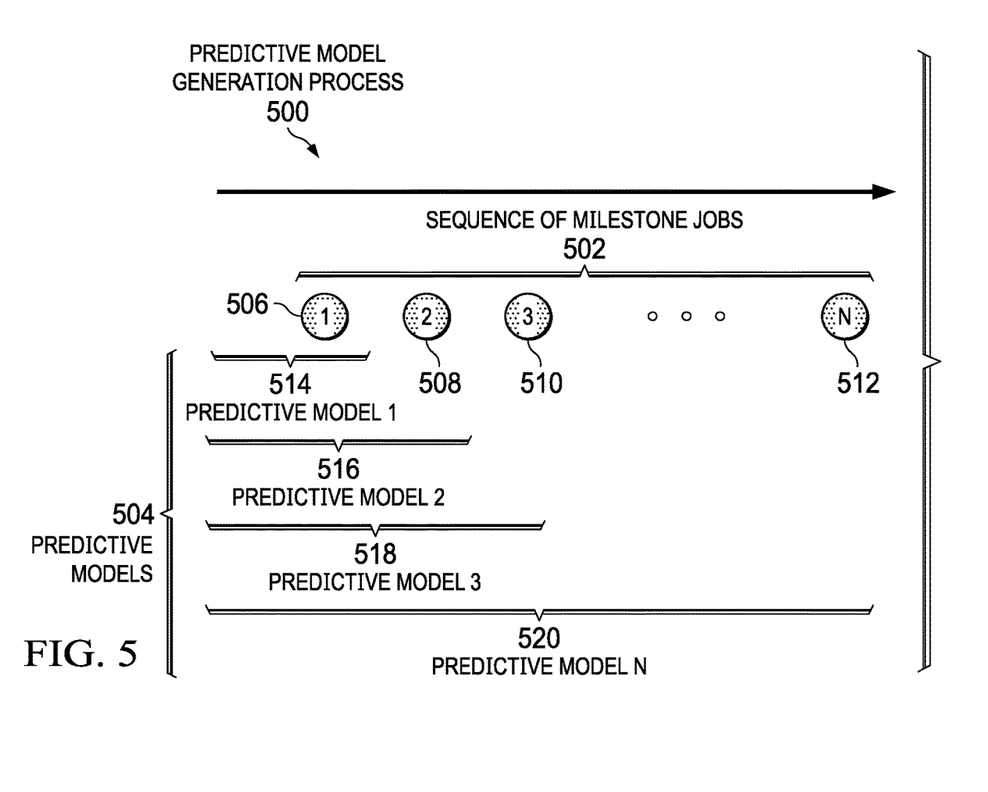
FIG. 5 is a diagram illustrating an example of a predictive model generation process in accordance with an illustrative embodiment.

With reference now to FIG. 5, a diagram illustrating an example of a predictive model generation process is depicted in accordance with an illustrative embodiment. Predictive model generation process 500 may be implemented in a computer, such as, for example, server 104 or server 106 in FIG. 1 or data processing system 200 in FIG. 2. For example, predictive model generation process 500 may be implemented by batch job manager 218 in FIG. 2.

In this example, predictive model generation process 500 includes sequence of milestone jobs 502 and predictive models 504. Sequence of milestone jobs 502 may be, for example, sequence of milestone jobs 412 in FIG. 4. In this example, sequence of milestone jobs includes milestone job 1 506, milestone job 2 508, milestone job 3 510, to milestone job N 512. Predictive models 504 represent a plurality of batch end time predictive models. In this example, predictive models 504 include predictive model 1 514, predicted model 2 516, predictive model 3 518, to predictive model N 520. It should be noted that the batch job manager of illustrative embodiments utilizes a set of machine learning models of an artificial intelligence component to generate predictive models 504 based on training data collected from previously run batches of jobs. When a new batch of jobs is running, the batch job manager retrieves and triggers a predictive model that corresponds to the currently running milestone job in the batch to provide an end time prediction. The final batch end time prediction is based on an aggregate of all predictive model batch end time predictions.

For example, the batch job manager retrieves and triggers predictive models 504 in a stepwise manner. In other words, the batch job manager retrieves and triggers predictive model 1 514, which corresponds to milestone job 1 506, after milestone job 1 506 finishes running. In other words, predictive model 1 514 is based on the profiling features of one milestone job (e.g., profiling features of milestone job 1 506). Thus, at the beginning, the batch job manager utilizes predictive model 1 514 to generate the first batch end time prediction.

Similarly, the batch job manager retrieves and triggers predictive model 2 516, which corresponds to milestone job 2 508, after milestone job 2 508 finishes running. In other words, predictive model 2 516 is based on the profiling features of two milestone jobs (e.g., profiling features of milestone job 1 506 and milestone job 2 508). The batch job manager utilizes predictive model 2 516 to generate the second batch end time prediction.

Then, the batch job manager retrieves and triggers predictive model 3 518, which corresponds to milestone job 3 510, after milestone job 3 510 finishes running. In other words, predictive model 3 518 is based on the profiling features of three milestone jobs (e.g., profiling features of milestone job 1 506, milestone job 2 508, and milestone job 3 510). The batch job manager utilizes predictive model 3 518 to generate the third batch end time prediction.

Finally, the batch job manager retrieves and triggers predictive model N 520, which corresponds to milestone job N 512, after milestone job N 512 finishes running. In other words, predictive model N 520 is based on the profiling features of "N" number of milestone jobs (e.g., profiling features of milestone job 1 506, milestone job 2 508, milestone job 3 510, to predictive model N 520). The batch job manager utilizes predictive model N 520 to generate the Nth batch end time prediction or the final batch end time prediction.

Thus, after the batch job manager retrieves each respective batch end time predictive model, the batch job manager assembles all available predictive models so far to form an aggregate or ensemble predictive model. The batch job manager uses this aggregate predictive model to dynamically update the batch end time prediction during running of the batch of jobs. It should be noted that the batch job manager can score the aggregate predictive model after a milestone job finishes running or on a predefined time interval, such as, for example, every 10 seconds. By aggregating the predictive models, the batch job manager increases the accuracy and stability of batch end time predictions.

Figure 6A:
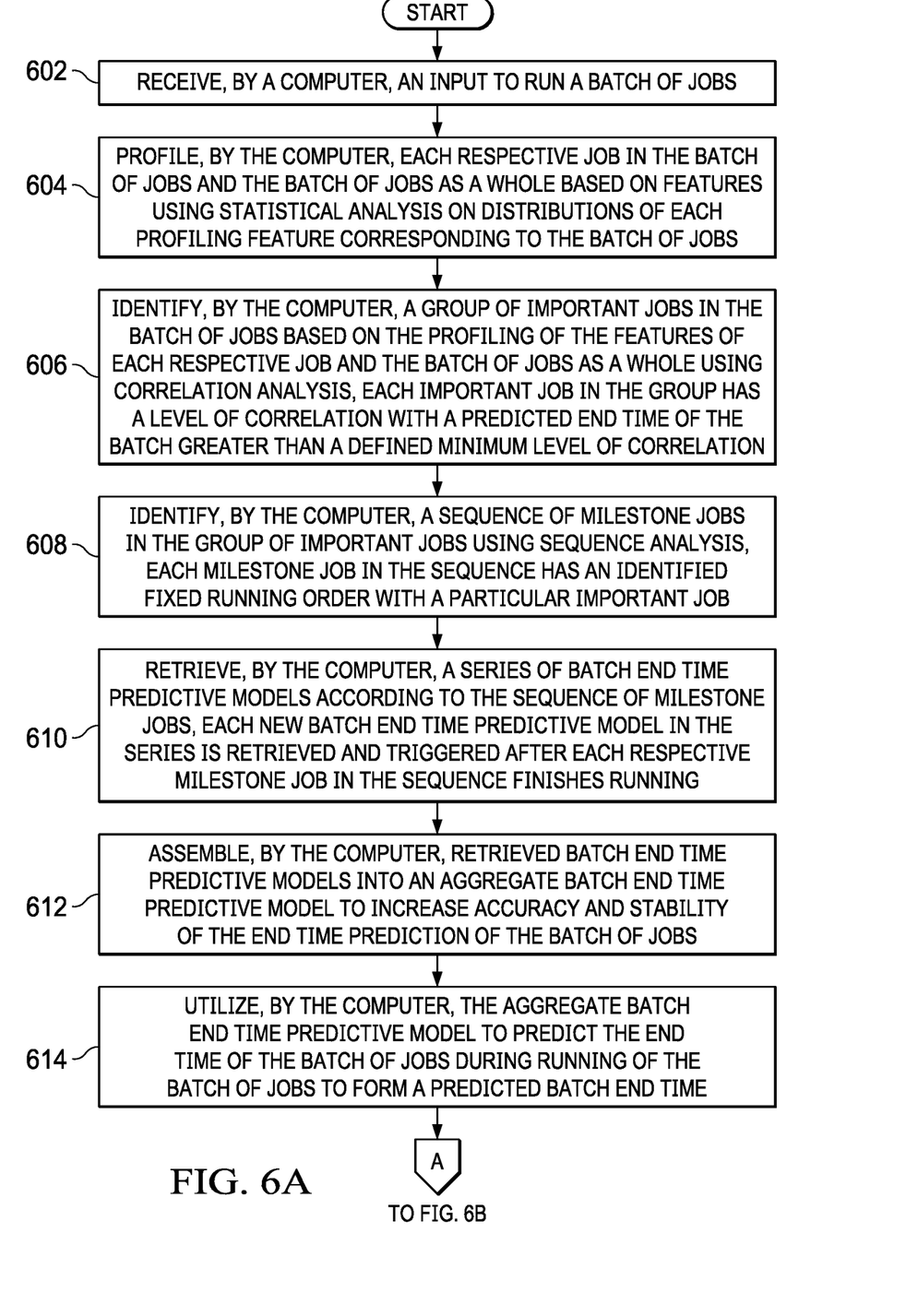
FIGS. 6A-6B are a flowchart illustrating a process for predicting an end time for a batch of jobs during running of the batch of jobs in accordance with an illustrative embodiment.
Figure 6B:
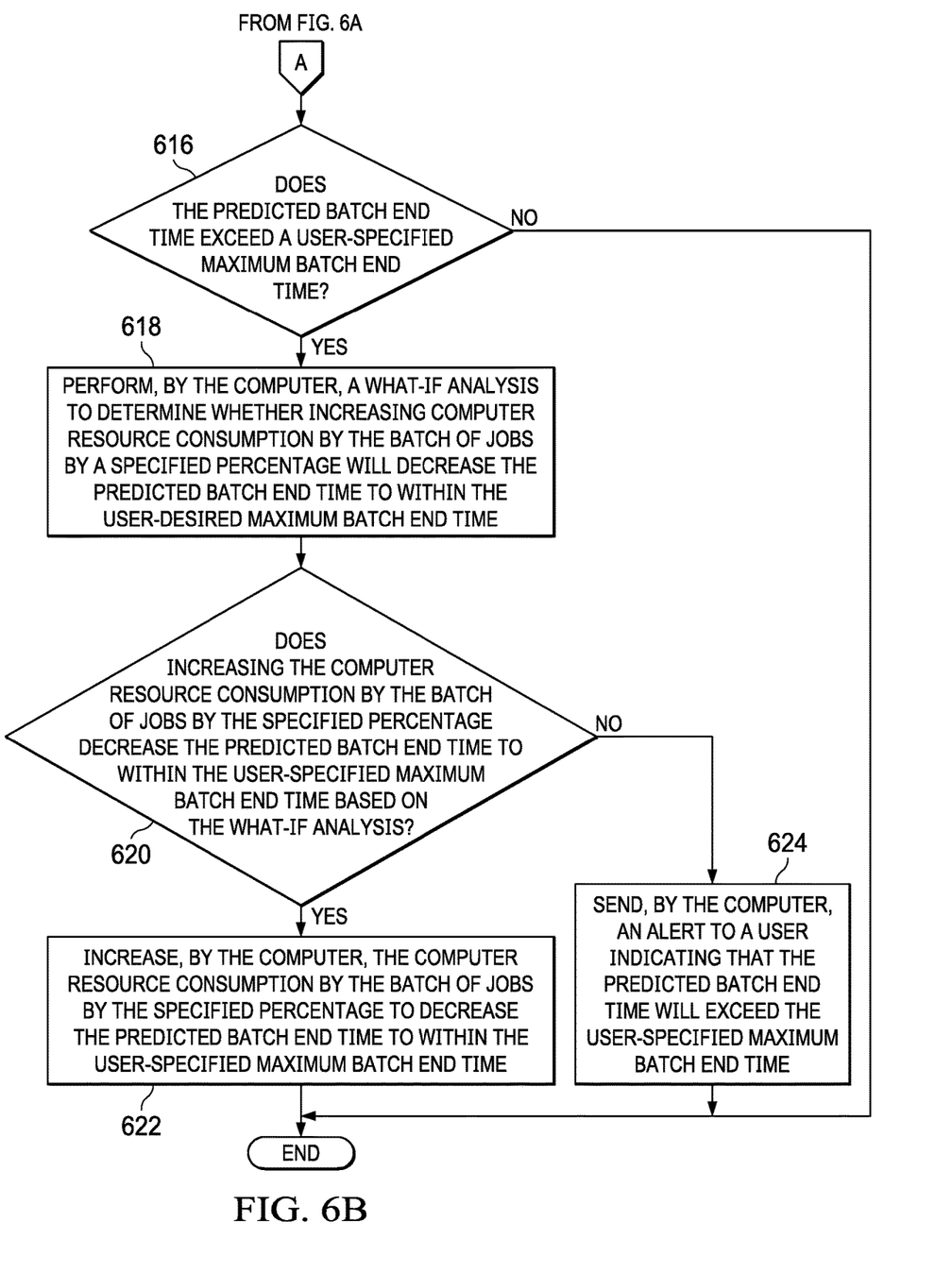

With reference now to FIGS. 6A-6B, a flowchart illustrating a process for predicting an end time for a batch of jobs during running of the batch of jobs is shown in accordance with an illustrative embodiment. The process shown in FIGS. 6A-6B may be implemented in a computer, such as, for example, server 104 in FIG. 1 or data processing system 200 in FIG. 2. For example, the process shown in FIGS. 6A-6B may be implemented in batch job manager 218 in FIG. 2.

The process begins when the computer receives an input to run a batch of jobs (step 602). In response to running the batch of jobs, the computer profiles each respective job in the batch of jobs and the batch of jobs as a whole based on features using statistical analysis on distributions of each profiling feature corresponding to the batch of jobs (step 604). The computer identifies a group of important jobs in the batch of jobs based on the profiling of the features of each respective job and the batch of jobs as a whole using correlation analysis (step 606). Each important job in the group of important jobs has a level of correlation with a predicted end time of the batch of jobs greater than a defined minimum level of correlation.

In addition, the computer identifies a sequence of milestone jobs in the group of important jobs using sequence analysis (step 608). Each milestone job in the sequence of milestone jobs has an identified fixed running order with a particular important job in the batch. Further, the computer retrieves and triggers a series of batch end time predictive models according to the sequence of milestone jobs (step 610). The computer retrieves and triggers each new batch end time predictive model in the series of batch end time predictive models after each respective milestone job in the sequence finishes running.

The computer assembles retrieved batch end time predictive models into an aggregate batch end time predictive model to increase accuracy and stability of the end time prediction of the batch of jobs (step 612). The computer utilizes the aggregate batch end time predictive model to predict the end time of the batch of jobs during running of the batch of jobs to form a predicted batch end time (step 614).

Afterward, the computer makes a determination as to whether the predicted batch end time exceeds a user-specified maximum batch end time (step 616). If the computer determines that the predicted batch end time does not exceed the user-specified maximum batch end time, no output of step 616, then the process terminates thereafter. If the computer determines that the predicted batch end time does exceed the user-specified maximum batch end time, yes output of step 616, then the computer performs a what-if analysis to determine whether increasing computer resource consumption by the batch of jobs by a specified percentage will decrease the predicted batch end time to within the user-specified maximum batch end time (step 618).

The computer makes a determination as to whether increasing the computer resource consumption by the batch of jobs by the specified percentage decreases the predicted batch end time to within the user-specified maximum batch end time based on the what-if analysis (step 620). If the computer determines that increasing the computer resource consumption by the batch of jobs by the specified percentage does decrease the predicted batch end time to within the user-specified maximum batch end time based on the what-if analysis, yes output of step 620, then the computer increases the computer resource consumption by the batch of jobs by the specified percentage to decrease the predicted batch end time to within the user-specified maximum batch end time (step 622). Thereafter, the process terminates. If the computer determines that increasing the computer resource consumption by the batch of jobs by the specified percentage does not decrease the predicted batch end time to within the user-specified maximum batch end time based on the what-if analysis, no output of step 620, then the computer sends an alert to a user indicating that the predicted batch end time will exceed the user-specified maximum batch end time (step 624). Thereafter, the process terminates.

Thus, illustrative embodiments of the present invention provide a computer-implemented method, computer system, and computer program product for providing dynamic batch end time predictions during running of a batch of jobs using predictive analysis that is based on aggregating newly generated batch end time predictive models after each respective milestone job in the batch of jobs finishes running. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for performing predictive analysis on running batch jobs, the computer-implemented method comprising:
retrieving, by a computer, a series of batch end time predictive models according to a sequence of milestone jobs in a batch of jobs;
assembling, by the computer, retrieved batch end time predictive models into an aggregate batch end time predictive model to increase accuracy and stability of an end time prediction of the batch of jobs;
utilizing, by the computer, the aggregate batch end time predictive model to predict an end time of the batch of jobs during running of the batch of jobs to form a predicted end time of the batch of jobs;
determining, by the computer, whether increasing computer resource consumption by the batch of jobs by a specified percentage decreases the predicted end time of the batch of jobs to within a specified maximum batch end time based on a what-if analysis; and
responsive to the computer determining that increasing the computer resource consumption by the batch of jobs by the specified percentage decreases the predicted end time of the batch of jobs to within the specified maximum batch end time based on the what-if analysis, increasing, by the computer, the computer resource consumption by the batch of jobs by the specified percentage to decrease the predicted end time of the batch of jobs to within the specified maximum batch end time.

2. The computer-implemented method of claim 1 further comprising:
profiling, by the computer, each respective job in the batch of jobs and the batch of jobs as a whole based on features using statistical analysis on distributions of each profiling feature corresponding to the batch of jobs; and
identifying, by the computer, a group of important jobs in the batch of jobs based on the profiling of the features of each respective job and the batch of jobs as a whole using correlation analysis, each important job in the group of important jobs has a level of correlation with the predicted end time of the batch of jobs greater than a defined minimum level of correlation.

3. The computer-implemented method of claim 2, wherein the features include job running time, job input/output consumption, job computing resource consumption, batch running time, and batch calendar.

4. The computer-implemented method of claim 2 further comprising:
identifying, by the computer, the sequence of milestone jobs in the group of important jobs using sequence analysis, each milestone job in the sequence of milestone jobs has an identified fixed running order with a particular important job in the batch.

5. The computer-implemented method of claim 1 further comprising:
determining, by the computer, whether the predicted end time of the batch of jobs exceeds a specified maximum batch end time; and
responsive to the computer determining that the predicted end time of the batch of jobs exceeds the specified maximum batch end time, performing, by the computer, a what-if analysis to determine whether increasing computer resource consumption by the batch of jobs by a specified percentage will decrease the predicted end time of the batch of jobs to within the specified maximum batch end time.

6. The computer-implemented method of claim 1 further comprising:
responsive to the computer determining that increasing the computer resource consumption by the batch of jobs by the specified percentage does not decrease the predicted end time of the batch of jobs to within the specified maximum batch end time based on the what-if analysis, sending, by the computer, an alert to a user indicating that the predicted end time of the batch of jobs will exceed the specified maximum batch end time.

7. The computer-implemented method of claim 1, wherein the computer retrieves and triggers each new batch end time predictive model in the series of batch end time predictive models after each respective milestone job in the sequence finishes running.

8. A computer system for performing predictive analysis on running batch jobs, the computer system comprising:
a bus system;
a storage device connected to the bus system, wherein the storage device stores program instructions; and
a processor connected to the bus system, wherein the processor executes the program instructions to:
retrieve a series of batch end time predictive models according to a sequence of milestone jobs in a batch of jobs;
assemble retrieved batch end time predictive models into an aggregate batch end time predictive model to increase accuracy and stability of an end time prediction of the batch of jobs;
utilize the aggregate batch end time predictive model to predict an end time of the batch of jobs during running of the batch of jobs to form a predicted end time of the batch of jobs;
determine whether increasing computer resource consumption by the batch of jobs by a specified percentage decreases the predicted end time of the batch of jobs to within a specified maximum batch end time based on a what-if analysis; and
increase the computer resource consumption by the batch of jobs by the specified percentage to decrease the predicted end time of the batch of jobs to within the specified maximum batch end time in response to determining that increasing the computer resource consumption by the batch of jobs by the specified percentage decreases the predicted end time of the batch of jobs to within the specified maximum batch end time based on the what-if analysis.

9. The computer system of claim 8, wherein the processor further executes the program instructions to:
profile each respective job in the batch of jobs and the batch of jobs as a whole based on features using statistical analysis on distributions of each profiling feature corresponding to the batch of jobs; and
identify a group of important jobs in the batch of jobs based on the profiling of the features of each respective job and the batch of jobs as a whole using correlation analysis, each important job in the group of important jobs has a level of correlation with the predicted end time of the batch of jobs greater than a defined minimum level of correlation.

10. The computer system of claim 9, wherein the features include job running time, job input/output consumption, job computing resource consumption, batch running time, and batch calendar.

11. The computer system of claim 9, wherein the processor further executes the program instructions to:
identify the sequence of milestone jobs in the group of important jobs using sequence analysis, each milestone job in the sequence of milestone jobs has an identified fixed running order with a particular important job in the batch.

12. A computer program product for performing predictive analysis on running batch jobs, the computer program product comprising a computer-readable storage medium having program instructions embodied therewith, the program instructions executable by a computer to cause the computer to perform a method of:
retrieving, by the computer, a series of batch end time predictive models according to a sequence of milestone jobs in a batch of jobs;
assembling, by the computer, retrieved batch end time predictive models into an aggregate batch end time predictive model to increase accuracy and stability of an end time prediction of the batch of jobs;
utilizing, by the computer, the aggregate batch end time predictive model to predict an end time of the batch of jobs during running of the batch of jobs to form a predicted end time of the batch of jobs;
determining, by the computer, whether increasing computer resource consumption by the batch of jobs by a specified percentage decreases the predicted end time of the batch of jobs to within a specified maximum batch end time based on a what-if analysis; and
responsive to the computer determining that increasing the computer resource consumption by the batch of jobs by the specified percentage decreases the predicted end time of the batch of jobs to within the specified maximum batch end time based on the what-if analysis, increasing, by the computer, the computer resource consumption by the batch of jobs by the specified percentage to decrease the predicted end time of the batch of jobs to within the specified maximum batch end time.

13. The computer program product of claim 12 further comprising:
profiling, by the computer, each respective job in the batch of jobs and the batch of jobs as a whole based on features using statistical analysis on distributions of each profiling feature corresponding to the batch of jobs; and
identifying, by the computer, a group of important jobs in the batch of jobs based on the profiling of the features of each respective job and the batch of jobs as a whole using correlation analysis, each important job in the group of important jobs has a level of correlation with the predicted end time of the batch of jobs greater than a defined minimum level of correlation.

14. The computer program product of claim 13, wherein the features include job running time, job input/output consumption, job computing resource consumption, batch running time, and batch calendar.

15. The computer program product of claim 13 further comprising:
identifying, by the computer, the sequence of milestone jobs in the group of important jobs using sequence analysis, each milestone job in the sequence of milestone jobs has an identified fixed running order with a particular important job in the batch.

16. The computer program product of claim 12 further comprising:
determining, by the computer, whether the predicted end time of the batch of jobs exceeds a specified maximum batch end time; and
responsive to the computer determining that the predicted end time of the batch of jobs exceeds the specified maximum batch end time, performing, by the computer, a what-if analysis to determine whether increasing computer resource consumption by the batch of jobs by a specified percentage will decrease the predicted end time of the batch of jobs to within the specified maximum batch end time.

17. The computer program product of claim 12 further comprising:
responsive to the computer determining that increasing the computer resource consumption by the batch of jobs by the specified percentage does not decrease the predicted end time of the batch of jobs to within the specified maximum batch end time based on the what-if analysis, sending, by the computer, an alert to a user indicating that the predicted end time of the batch of jobs will exceed the specified maximum batch end time.

18. The computer program product of claim 12, wherein the computer retrieves and triggers each new batch end time predictive model in the series of batch end time predictive models after each respective milestone job in the sequence finishes running.

* * * * *